US012750647B2

(12) United States Patent
Feng et al.

(10) Patent No.: US 12,750,647 B2
(45) Date of Patent: Sep. 29, 2026

(54) METHOD OF AND A SYSTEM FOR TRANSMITTING A BLOCK OF DATA TO NODE DEVICES IN A NETWORK

(71) Applicant: SIGNIFY HOLDING B.V., Eindhoven (NL)

(72) Inventors: Lei Feng, Shanghai (CN); Jaya Karthik, Bangalore (IN)

(73) Assignee: SIGNIFY HOLDING B.V., Eindhoven (NL)

(*) Notice: Subject to any disclaimer, the term of this patent is extended or adjusted under 35 U.S.C. 154(b) by 238 days.

(21) Appl. No.: 18/728,115

(22) PCT Filed: Jan. 5, 2023

(86) PCT No.: PCT/EP2023/050163
§ 371 (c)(1),
(2) Date: Jul. 11, 2024

(87) PCT Pub. No.: WO2023/135049
PCT Pub. Date: Jul. 20, 2023

(65) Prior Publication Data

US 2025/0080963 A1 Mar. 6, 2025

(30) Foreign Application Priority Data

Jan. 14, 2022 (WO) ................ PCT/CN2022/072152
Feb. 25, 2022 (EP) .................................... 22158796

(51) Int. Cl.
*H04W 4/80* (2018.01)

(52) U.S. Cl.
CPC .................................... *H04W 4/80* (2018.02)

(58) Field of Classification Search
CPC ........................................................ H04W 4/80
See application file for complete search history.

(56) References Cited

U.S. PATENT DOCUMENTS

| | | | | |
|---|---|---|---|---|
| 10,809,999 | B2 | 10/2020 | Adrangi et al. | |
| 2013/0326494 | A1 | 12/2013 | Nunez | |
| 2016/0021613 | A1* | 1/2016 | Mani | G01D 4/002 370/311 |
| 2016/0157093 | A1 | 6/2016 | Jiang | |

(Continued)

FOREIGN PATENT DOCUMENTS

| | | | |
|---|---|---|---|
| CN | 213693768 | U | 7/2021 |
| KR | 20170121911 | A | 11/2017 |
| WO | 2021136719 | A1 | 7/2021 |

*Primary Examiner* — David Bilodeau

(57) ABSTRACT

A method of transmitting a block of data to node devices in a network is disclose. The network comprises a plurality of operatively interconnected node devices, each node device supports both long range communication and short range communication. The method comprises the steps of: receiving, by at least one node device selected for receiving the block of data, at least a part of the block of data via long range communication: receiving, by other node devices via long range communication, an indication to receive the at least part of the block of data via short range communication: transmitting, by the at least one selected node device, the at least part of the block of data to other node devices via short range communication; and receiving, by one of the other node devices, the at least part of the block of data via short range communication.

15 Claims, 6 Drawing Sheets

(a)

(b)

(56) References Cited

U.S. PATENT DOCUMENTS

| | | | | |
|---|---|---|---|---|
| 2018/0262949 | A1* | 9/2018 | Van Phan | H04L 1/1812 |
| 2019/0379764 | A1 | 12/2019 | Andreola et al. | |
| 2020/0120513 | A1 | 4/2020 | Cahill-O | |
| 2020/0228235 | A1* | 7/2020 | Richardson | H04W 72/30 |
| 2021/0011705 | A1* | 1/2021 | Liu | H04L 67/34 |
| 2021/0342431 | A1* | 11/2021 | Kim | H04N 21/4828 |
| 2025/0202626 | A1* | 6/2025 | Keränen | H04W 76/40 |

* cited by examiner (a)

(b)

METHOD OF AND A SYSTEM FOR TRANSMITTING A BLOCK OF DATA TO NODE DEVICES IN A NETWORK

CROSS-REFERENCE TO PRIOR APPLICATIONS

This application is the U.S. National Phase application under 35 U.S.C. § 371 of International Application No. PCT/EP2023/050163, filed on Jan. 5, 2023, which claims the benefit of International Application No. PCT/CN2022/072152, filed on Jan. 14, 2022 and European Patent Application Ser. No. 22/158,796.7, filed on Feb. 25, 2022. These applications are hereby incorporated by reference herein.

TECHNICAL FIELD

The present disclosure generally relates to the field of wireless communication, and more specifically, to a method of and a system for transmitting a block of data to node devices in a network comprising a plurality of operatively interconnected node devices.

BACKGROUND

Electric or electronic devices, such as lighting devices and Internet of Things, IoT, devices, and devices supporting enhanced Machine-Type Communication, eMTC, for example, all of which comprise data communication capabilities, are frequently deployed in networks comprised of a plurality of interconnected devices.

These devices, generally called node devices or terminal devices, typically operate a long range communication interface, such as a network adapter or a transceiver module, for data exchange with remote devices, such as a backend server, and a short range communication interface, such as a transceiver module, for communication between node devices only, also called inter-node device communication.

The long range communication interface may operate in accordance with a wireless mobile communication standard, such as designated 2G/3G/4G/5G cellular communication including Narrowband IoT, NB-IoT, and other long-range wireless communication technologies like Long Range Wide Area Network, LoRaWAN or proprietary communication technologies, for example.

The short range communication interface may operate in accordance with a network protocol for exchanging data by networked devices or nodes, such as designated ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), KNX (and KNX based systems), and proprietary communication technologies and protocols, for example.

A lighting system may employ a Micro Control Unit, MCU, equipped with a wireless local area network interface supporting for example Zigbee, Bluetooth or proprietary protocols as lighting controllers and use for example a cellular modem to enable connection to remote devices via the cellular network. The cellular network enables lighting management application by way of a remote device such as a backend server. In the meanwhile, the local area network is planned to be used for such as Lighting on Demand applications.

A firmware of the lighting application in the MCU and a firmware of the cellular modem may require update from time to time. It is noted that these firmware updates are usually of a relatively large size, such as from 500 KB to 10 MB. As lighting devices usually have a limited cellular subscription plan (e.g. 2 MB/year), it will be difficult for the lighting devices to handle firmware updates by relying on their available cellular subscription plan. As a result, additional cost for firmware download may be incurred, which is not really desirable.

CN213693768U relates to a light controller and a node controller physically disposed together and each have a long-range communication interface. There is also a short-range communication interface arranged for data exchange between the light controller and the node controller. One of the two long rang communication interfaces is selectively closed by exchanging data through the short-range data exchange path and the other one of the long-range communication interfaces.

KR20170121911A relates to the firmware update of the IoT devices using the P2P. The firmware server divides the firmware into several chunks and produces a chunk map designating the seed chunks which the first IoT devices to distribute. The first IoT devices then distribute the chunks to other IoT devices.

U.S. Pat. No. 10,809,999B2 discloses that the firmware upgrade can be provided to a CIoT device via a firmware pusher device. The firmware pusher device places the CIoT device in a download mode by communicating with a first radio of the CIoT device, the first radio receiving a request to be placed in a download mode via an eNB. The firmware pusher device can push the firmware to the CIoT device via a second radio of the CIoT device.

WO2021136719A1 discloses that a provisioning of network nodes is initiated by a backend server by exchanging provisioning information with a selected node device using the long range communication interface. The selected provisioned node device may operate as a provisioner or proxy of other nodes by using the short range communication interface.

Therefore, there is a genuine need for a method of transmitting a block of data, from for example a remote device, to node devices in a network at a reduced cost while ensuring reliable and correct transmission of the block of data to the target node devices.

SUMMARY

In a first aspect of the present disclosure, there is presented a method transmitting a block of data to node devices in a network comprising a plurality of operatively interconnected node devices, each node device supporting both long range communication and short range communication, the method comprising the steps of:

- receiving, by at least one node device selected for receiving the block of data, at least a part of the block of data via long range communication;
- receiving, by other node devices via long range communication, an indication to receive the at least part of the block of data via short range communication;
- transmitting, by the at least one selected node device, the at least part of the block of data to other node devices via short range communication; and
- receiving, by one of the other node devices, the at least part of the block of data.

The present disclosure is based on the insight that a wireless local area network may be used to transmit a block of data, such as firmware updates to light devices in a lighting system, between node devices using short range communication in a network of interconnected node devices. The method thereby allowing the block of data downloaded to one of the node devices in the network using long range communication to be transmitted or forwarded to other node devices in the network without incurring extra long range communication cost, such as cost for wireless communication.

This can be conveniently realized in a network of interconnected node devices, where each node device supports both long range and short range communications. The node devices together with one or more remote devices providing the block of data, such as backend servers, form a system for transmitting the block of data, such as over-the-air, OTA, firmware updates which are usually of large size, to the node devices.

Specifically, as a preparatory step, a backend device may first select a node device for receiving the block of data using the long range communication. In the meantime, other node devices in the network which also have to receive the block of data is notified by the remoted device, for example, by an identification of the block of data transmitted from the backend device to the other node devices, also using the long range communication.

The block of data is then transmitted to the selected node device, in whole or in part, from the same remote device or a different remote device, via long range communication, which will then transmit the received block of data to the other node devices using short range communication. The other node devices can thereby receive the block of data using the short range communication, without consuming the limited available bandwidth for the long range communication. The other node devices may receive small a part of the block of data using the long range communication if they cannot get the complete data from the short range communication.

Based on the above described method, only the selected node device will have a large amount of data traffic involving the long range communication, while the other node devices can save available cellular subscription plan as they receive the block of data using the local area network, which involves the short range communication.

As a result, the total data traffic via the long range communication such as cellular networks and average data traffic per node device via the cellular networks are much reduced and the cost for mobile subscription fee are reduced as well.

As an example of the present disclosure, the at least one selected node device is selected, by a remote device, based on at least one of locations, long range communication data consumption, long range communication plans and short/long range communication quality of service of the node devices.

The remote device, such as a backend server in a lighting system, usually has location coordinates of all node devices in the network. Thus, the server can decide which node device should receive the block of data by using the long range cellular network and which nodes will receive the block of data by using the wireless local area network from the peer nodes based on their locations.

Moreover, communication plans and data consumption states of the node devices may also be considered, thereby allowing the remote device to select one or more node device suitable for receiving the block of data using the long range communication, without compromising other communication tasks involving long range communication seriously.

It can be contemplated by those skilled in the art that other factors, such as long and short range communication quality of service of the node devices in the network, may also be considered by the remote device, so as to ensure reliable transmission of the block of the data both over the long and short range communications, while preventing transmission failure or waste of communication resources.

As an example of the present disclosure, two or more node devices are selected for receiving the block of data respectively via long range communication;

the step of receiving, by at least one selected node device, at least a part of the block of data via long range communication comprises receiving different parts of the block of data respectively by the selected node devices via long range communication;

the step of transmitting, by the at least one selected node device, the at least part of the block of data to other node devices via short range communication comprises each of the at least one selected node devices transmitting the respectively received part of the block of data via short range communication; and the step of receiving, by one of the other node devices, the at least part of the block of data comprises the one of the node devices receiving the different parts of the block of data from each of the at least one selected node devices.

It can happen that a cellular operator's subscription plan may have limits in terms of maximum data volume per year or per month. It can also happen that the system needs to optimize the data traffic to be distributed to different nodes. In these cases, the remote device may split the block of data to several parts and transmit the parts to different node devices, selected for receiving the block of data, via their cellular interfaces. These node devices will then transmit the part of the block of data that they receive to other node devices by using wireless local area network communication.

It thereby avoids consuming only the data package for one specific node and still manages to get the block of data downloaded to the node devices in the network, without overrunning the data volume limits.

It can be contemplated by those skilled in the art that the different nodes may receive and send the same parts of the data block, which will help to improve the reliability of the transmission to the other node devices using the short range communication.

In the above example the step of transmitting by the at least one selected node device comprises the at least one selected node device transmitting the different parts of the block of data in a specific order.

This helps to ensure that the other node devices will receive the different parts of the block of data in a correct order, which is beneficial in ensuring the integrity of the block of data.

In an example of the present disclosure, the step of transmitting by the at least one selected node device is performed using broadcast or multicast, the broadcast or multicast is preferably repeated multiple times.

In the case of an application scenario, such as a street-lighting application, involving relatively long inter-node distance and lower density of the nodes, taking into consideration the fact that the block of data has to be distributed from one or a few node devices to many other node devices, broadcast or multicast type of messages may be conveniently used for the distribution of the block of data from a node device to many other node devices.

In practice, the broadcast or multicast may be repeated multiple times. As the transmission of the block of data, in part or in whole, from the node device receiving the data from the backend device to the other node devices involves one-to-many communication, a request-and-confirmation mechanism is not suitable for checking whether the delivery is successful. In order to enhance the robustness for a long inter-node distance environment, each broadcast or multicast message may be repeated for several times. The message is successfully transferred if any one of the repeating messages is received at a target node device.

The block of data can be encrypted and protected by the encryption and integrity check via keys and signatures transferred by the cellular network.

In an example of the present disclosure, wherein the at least part of the block of data transmitted by the at least one selected node device is relayed by node devices in the network via short range communication.

For the purpose of extending coverage of the messages used for transmitting the block of data between node devices in the local area network, the messages can be relayed by other nodes. The relay feature can leverage on the selected wireless communication protocol, Bluetooth mesh being one example. The relay nodes are defined in the protocol and can be enabled or disabled by a command from the cellular network or the wireless local area network.

In an example of the present disclosure, the method further comprising:

requesting, by one of other node device, a missing part of the block of data from a remote device; and transmitting, by the remote device, the requested missing part directly of the block of data to the one of other node device via long range communication.

It can happen that a part of the block of data is not received by one of the node devices supposed to receive the same, due to for example loss of packet or disruption with the local area network. In this case, as the missing part of the block of data is of a relatively small size, the node device can request the remote device to transmit the missing part to it directly using the long range communication. This will not cost much burden to the data subscription plan available to the node device, while ensuring that the missed part is obtained in a reliable way.

It is noted that the long range communication and short range communication can work simultaneously. As an example, a node device asking the backend server to send a missing piece of the block of data by using the cellular network can be proceeded in between the broadcast messages for transmitting other parts of the block of data to the node devices, or at the end of all broadcast messages.

In an example of the present disclosure, the method further comprising:

storing, by one of the other node devices, the received part of the block of data to an internal or external storage device.

When the block of data comprises firmware updates, the block of data is stored locally such that any update needed to the firmware may be performed later, when the whole update file is received.

It can also happen that the block of data is too large to be stored locally in the node device, for example in an internal or external memory of the MCU of the node device. In this case, in an example of the present disclosure, the block of data comprises a plurality of consecutive of pieces of data, each piece of data is stored by the one of the other node devices upon receiving it via the short range communication, the method further comprising the steps of:

requesting, by the one of the other node devices, a piece of data that is missing directly from the remote device;

transmitting, by the remote device, the requested missing piece of data to the one of the other node devices; and transmitting, by the one of the other node devices, at least a consecutive part of the plurality of consecutive of pieces of data to the external storage device.

The external storage device may be for example a storage space of the long range communication module of the node device, such as a cellular modem. The whole file may be transferred into the external storage module instantly.

A feasible way of operation will comprise the following steps: a node device receives a piece of data from a peer node via the local area network. The MCU of the node device stores the received piece of data in the buffer of an embedded or external flash memory. A missing piece is requested from the remote device directly by the node device. The node device will then transmit a consecutive pieces of data to the external storage. It may repeat the above steps to have the whole file stored in the external storage device.

By this means, the large file may be still downloaded and stored in the node device although the MCU has limited storage space.

In an example of the present disclosure, the long range communication comprises wireless mobile communication.

In an example of the present disclosure, the short range communication comprises Bluetooth communication, Zigbee communication, Z-Wave communication or a proprietary communication.

In an example of the present disclosure, the node devices are lighting devices, and the file is firmware updates to be received by the lighting devices.

The method can be advantageously applied to a lighting system such as a street lighting system involving many lighting devices, for downloading firmware updates to the MCU controllers and cellular modems of the lighting devices.

A second aspect of the present disclosure provides system for transmitting a block of data from a remote device to node devices in a network comprising a plurality of operatively interconnected node devices, each node device supporting both long range communication and short range communication, wherein:

at least one node device selected for receiving the block of data is configured to receive at least a part of the block of data via long range communication;

other node devices are configured to receive, via long range communication, an indication to receive the at least part of the block of data via short range communication;

the at least one selected node device is further configured to transmit the at least part of the block of data to other node devices via short range communication; and each of the other node devices is configured to receive the at least part of the block of data from the at least one selected node device.

In an example, the system further comprises at least one remote device configured to:

select the at least one node device based on at least one of locations, long range communication data consumption, long range communication plans and short/long range communication quality of service of the node devices.

It will be understood by those skilled in the art that one or more remote devices such as backend servers also coordinate with each other to transmit the block of data, in part or in whole, to the selected node devices, and also to transmit a small part of the block of data to one of the other node devices requesting the same from the remote devices.

A third aspect of the present disclosure provides a computer program product, comprising a computer readable storage medium storing instructions which, when executed on at least one processor, cause said at least one processor to carry out the method according to the first aspect of the present disclosure.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Embodiments contemplated by the present disclosure will now be described in more detail with reference to the accompanying drawings. The disclosed subject matter should not be construed as limited to only the embodiments set forth herein. Rather, the illustrated embodiments are provided by way of example to convey the scope of the subject matter to those skilled in the art.

In the following description, similar numeral references refer to the same or similar parts of a system. Besides, the terms “file” and “block of data” are used interchangeably.

Figure 1:
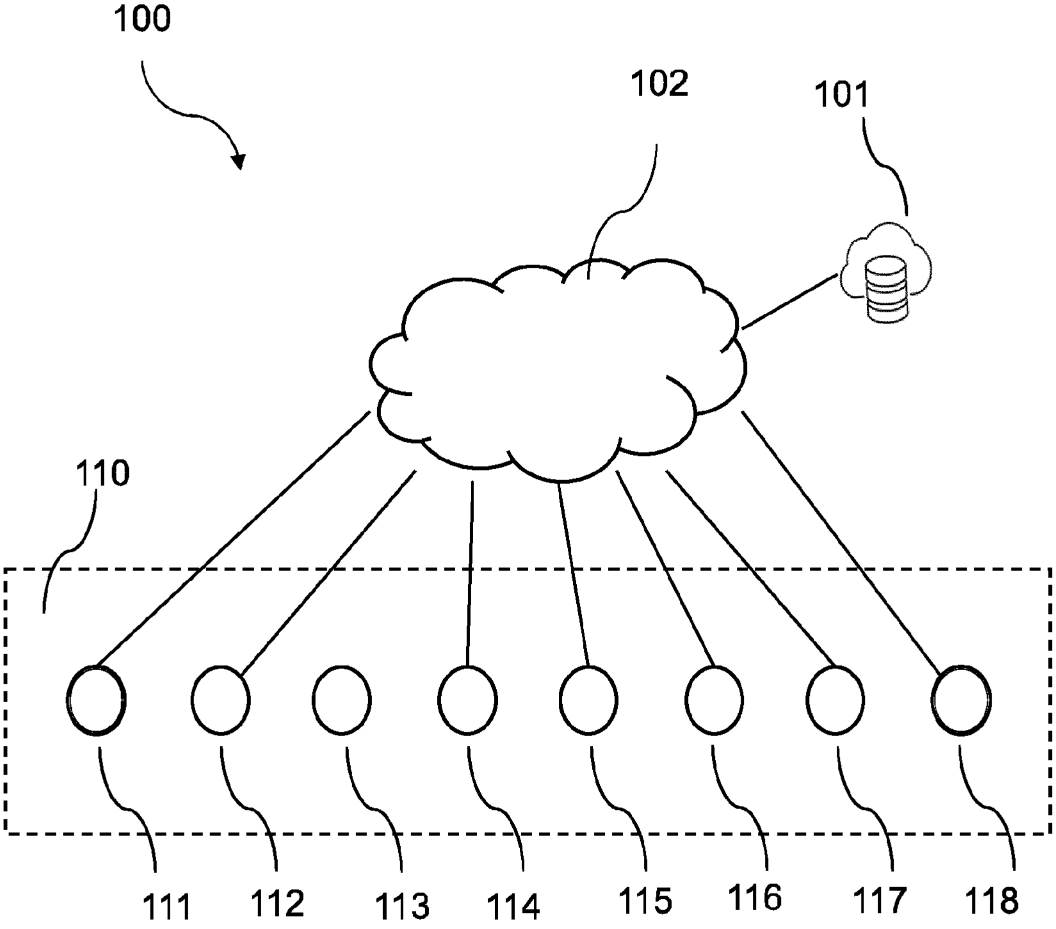
FIG. 1 schematically illustrate a system comprising a remote device and a network comprising a plurality of interconnected node devices in accordance with an embodiment of the present disclosure.

FIG. 1 schematically illustrates a system 100 comprising a remote device 101 and a network 110 comprising a plurality of interconnected node devices 111-118 in accordance with an embodiment of the present disclosure. The network 110 may be for example a streetlighting system comprising many lighting devices deployed along streets and roads in a city.

Each node device 111-118 comprises a short range communication interface for supporting short range communication with other node devices in the network 110, for implementing for example light on demand service. Each node device 111-118 further comprises a long range communication interface for supporting long range communication with the remote device 101, such as a backend server, via for example a tele-communication network or internet 102, so as to implement for example light management applications.

Firmware within a device, such as a Micro control Unit, MCU, implementing the short range communication interface or a cellular modem implementing the long range communication interface, may be updated from time to time, to facilitate smooth and proper running of the applications on the node device. The update may involve downloading a file comprising a update package from the remote device 101, or a different node device, to the node device, via the cellular network or internet 102.

Figure 2:
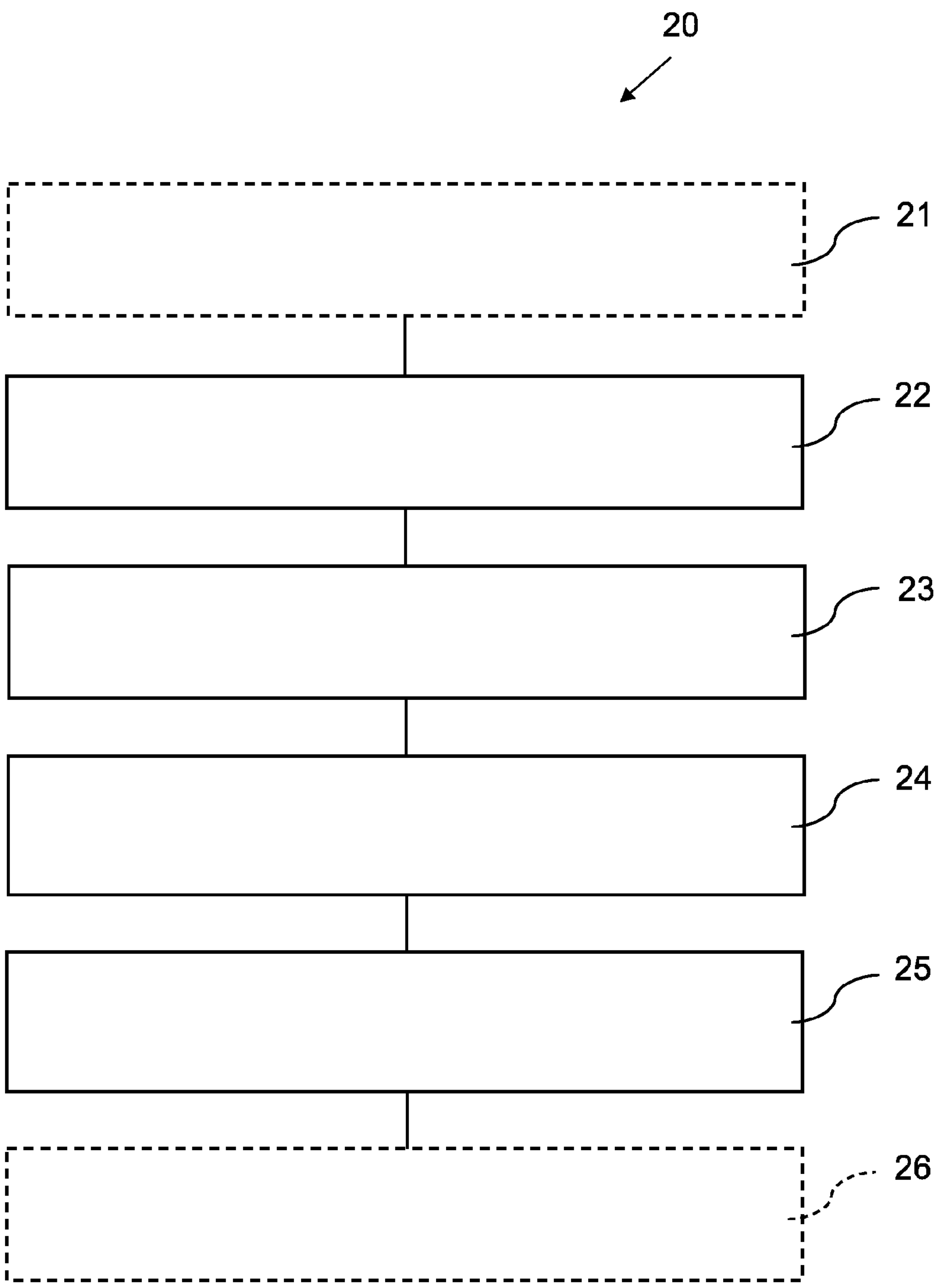
FIG. 2 schematically illustrates, in a flow chart type diagram, an embodiment of a method of transmitting a block of data from a remote device to a node device in a network as illustrated in FIG. 1, according to the present disclosure.

FIG. 2 schematically illustrates, in a flow chart type diagram, an embodiment of a method 20 of transmitting a file, from a remote device, to node devices in a network as illustrated in FIG. 1, according to the present disclosure.

At a preparatory step 21, the remote device 101 selects at least one node device for receiving the file from the remote device 101, for from another remote device, via long range communication, such as via the cellular network or internet 102.

In an exemplary lighting system, the backend server 101 has location coordinates of all node devices, that is, lighting devices, in the network. Thus, the server 101 can decide which node device should receive the file by using the long range cellular network and which nodes will receive the file via the local area network by using the short range communication, based on the locations of the node devices.

Moreover, communication resources available to each node device, such as cellular communication plans, data consumption states of the node devices and short range communication quality of service between node devices may also be considered by the backend server 101, thereby allowing the backend server 101 to select a node device suitable for receiving the file using the long range communication, without compromising other communication tasks involving long range communication seriously.

As an example, the backend server 101 may select the node device 111 in the network 110 for receiving the file via its long range communication interface.

As another example, the backend server 101 may select two or even more node devices, such as node 111 and 114, for receiving the file via their long range communication interfaces. This is in consideration of a scenario where cellular subscription plans of the node devices may have limits in terms of maximum data volume per year or per month. It may also be the case that the system has a requirement of optimizing the data traffic by distributing the traffic to different node devices.

Thereafter, at step 22, the selected node device receive at least a part of the file via long range communication from the remote device. It can be contemplated by those skilled in the art that the file may be transmitted in part or in whole to the selected node device.

Figure 3:
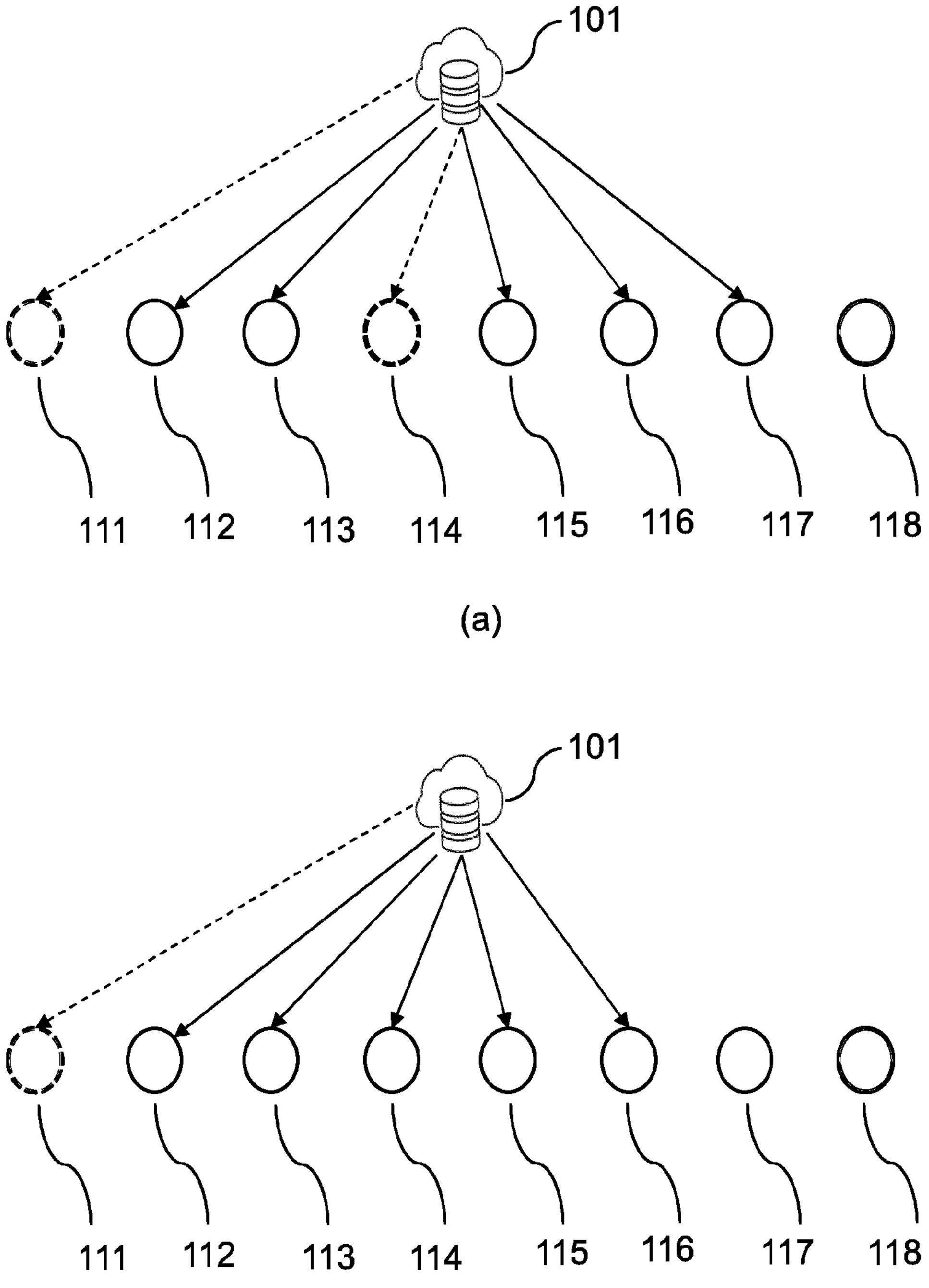
FIGS. 3*a* and 3*b* schematically illustrate a remote device transmitting a block of data to a selected node device in the network, in accordance with another embodiment of the present disclosure.

Referring to FIG. 3(*a*), as an example, when multiple node devices such as 111 and 114 are selected for receiving the file, the remote device such as the backend server 101 will split the file to be transmitted into several parts, and transmit each part to a different selected node device, by way of the long range communication between the remote device and the node devices. This is in line with the requirement of having network traffic distributed to different node device. Transmission of the file from the backend server 101 to the selected node device is illustrated by a dashed line in the drawings.

For the purpose of ensuring more reliable transmission, the remote server may also transmit the same part of the file to both the selected node devices.

Alternatively, referring to FIG. 3(*b*), the file may be transmitted to a single selected node device 111, which is beneficial in keeping integrity of the file.

In the meantime, at step 23, other node devices in the network 110, which also have to receive the file, receives an indication of the file from the backend server.

As an example, in the case of FIG. 3(*a*), node devices 112, 113, 115 to 117 which are in need of firmware update will receive an indication of the file from the backend server, such as a version number and length or size of the firmware, which allows those node devices to know that they are expecting the file.

It can be contemplated by those skilled in the art that the indication may also optionally comprise identifiers of the selected node devices, which may facilitate transmission of the file from the selected node devices to the other node devices thereafter. Alternatively, the indication may just a simple note on there will be file update/data sending by a node device in the network, each of the other node devices may decide whether to receive the file or update or not by itself.

In the case of FIG. 3(*b*), node devices 112-116 will received an indication of the file.

At step 24, the one or more selected node devices, such as node device 111 or 114 or both of them, transmit the (part of) file that they receive from the backend device to other node devices via short range communication.

The short range communication may be for example Bluetooth communication with a Bluetooth mesh network. It can be contemplated by those skilled in the art that other short range communication protocols may be used, such as ZigBee, Z-Wave communication or a proprietary communication protocol.

For an application scenario such as a streetlighting application, there is long pole-to-pole distance, low density of the node devices, one to many communication between the node devices. For this kind of applications, broadcast or multicast type of messages can be advantageously used for distributing a file from a node to many other nodes. Therefore, the one or more selected node device may broadcast the received file, in part or in whole, to other node devices.

Figure 4:
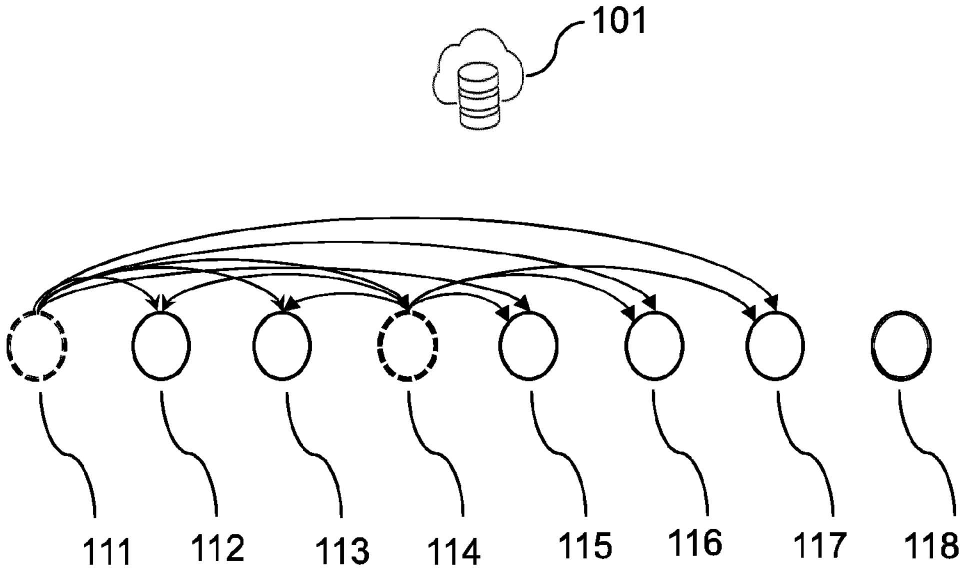
FIGS. 4*a* and 4*b* schematically illustrate the selected node device transmitting the block of data received from the remote device to other node devices in the network, in accordance with another embodiment of the present disclosure.
Figure 4:
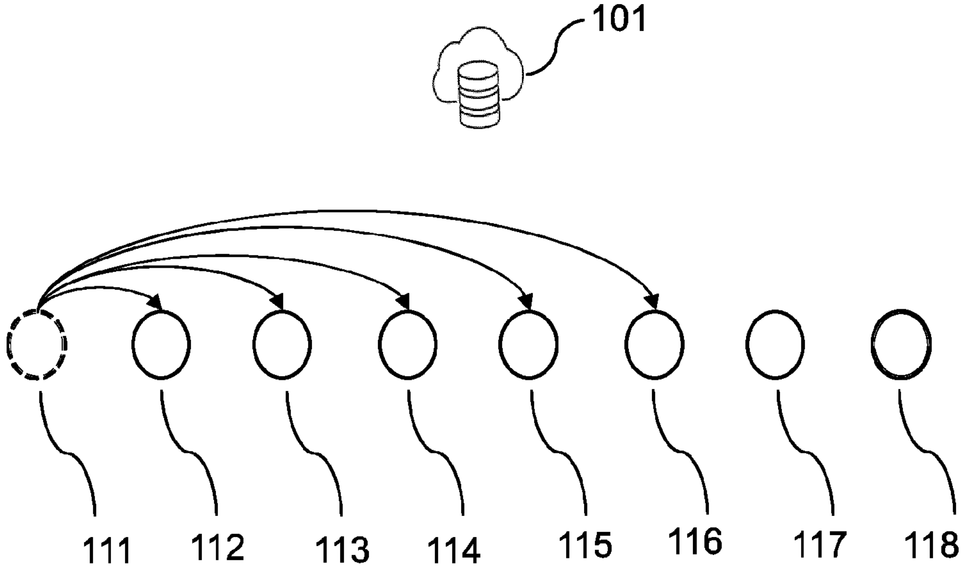

Referring to FIG. 4(*a*), when multiple node devices such as 111 and 114 are selected to receive the file from the backend server 101, each of the selected node devices 111 and 114 will broadcast the part of file that it receives from the backend server 101 in the network. FIG. 4(*b*) illustrates the scenario where only one selected node device 111 broadcasts the received file in the network.

In order to extend the coverage of the node devices 111 and 114, the file can be relayed by other nodes. The relay feature can leverage on the selected wireless communication protocol (e.g. Bluetooth mesh). The relay nodes are defined in the protocol and can be enabled or disabled by the command from the cellular network or wireless local area network.

Because of the one-to-many communication used for transmitting the file, a request-and-confirmation mechanism is not suitable for checking the successful delivery. In order to enhance the robustness for a long pole-to-pole environment, each broadcast/multicast message is repeated for several times. The message is considered as being successfully transferred if any one of the repeating messages is received at the target node. The file can be encrypted and protected by the encryption and integrity check via keys and signatures transferred by the cellular network.

At step 25, a node devices receiving an indication of the file at step 23 receives the file, from the one or more selected node devices.

In the case of FIG. 4(*a*), the node device 111 which only receives a part of the file from the backend server 101 receives the further part of the file from the node device 114, while the node device also receives the part of the file that is transmitted by the node device 111. Other node devices 112, 113, 115 to 117 will receive, from both the node devices 111 and 114, a part of the file. The node device 118 may also receive the part of the file from the node devices 111 and 114. It will not take any further action as it was not informed by the backend server that it is in need of the file.

Each node device in need of the file and chooses to receive the file will store the file in a buffer of an embedded or external flash memory of the MCU. When all parts of the file are successfully received by a node device, it will proceed to update the firmware of the MCU.

It is likely that a piece or part of the file is not received by a node device and therefore considered as missing, in this case, at step 26, the node device may request the backend server 101 to send the part of file to it directly using the long range communication. As only part of the file is transmitted directly from the backend server 101 to the node device, it will not cost much of the long range data package available to the node device.

Figure 5:
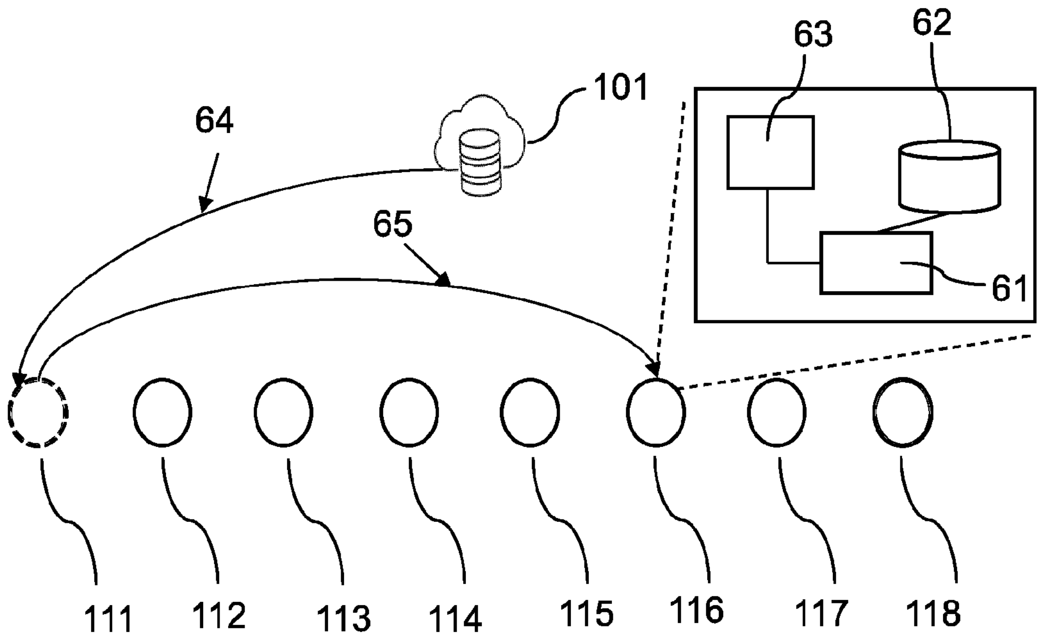
FIG. 5 schematically illustrates transferring the received part of the block of data to another module in the node device, in accordance with the present disclosure.

FIG. 5 schematically illustrates transferring a file to another module of a node device, in accordance with the present disclosure.

The other module may be for example a cellular modem 63 of a node device 116 to receive the file via the short range communication. Normally the file is stored at an embedded or external flash memory 62 of the MCU 61 supporting the shorting range communication interface of the node device. If the file it too large to be saved in the MCU's internal or external memory, the file may be transferred into the a further module such as the cellular modem 63 of the node device 116, instantly.

It can be contemplated by those skilled in the art, the block of data comprising a large file comprises a plurality of consecutive of pieces of data. When the node device 111, which has received 64 the file, such as a part of the file comprising a number of consecutive of pieces of data, from the backend device 101 via the long range communication, transmits 65 the part of file to the node device 116 via the short range communication, the MCU of the node device 116 will store or buffer the consecutive of pieces of data in its internal or external memory 62.

When the node devices 116 finds that a piece of data is missing, it proceeds to request the missing piece of data directly from the backend server 101. The backend server 101 will transmit the requested missing piece of data to the node device 116 directly. The node device 116 may then transfer at least a consecutive part of the plurality of consecutive of pieces of data to the external storage device, such as the cellular modem 63 of the node device 116, for example, when it has buffered enough pieces. The above steps may be repeated to transfer the whole file to another module of the node device. This allows the node device with limited MCU memory to store a larger file.

Figure 6:
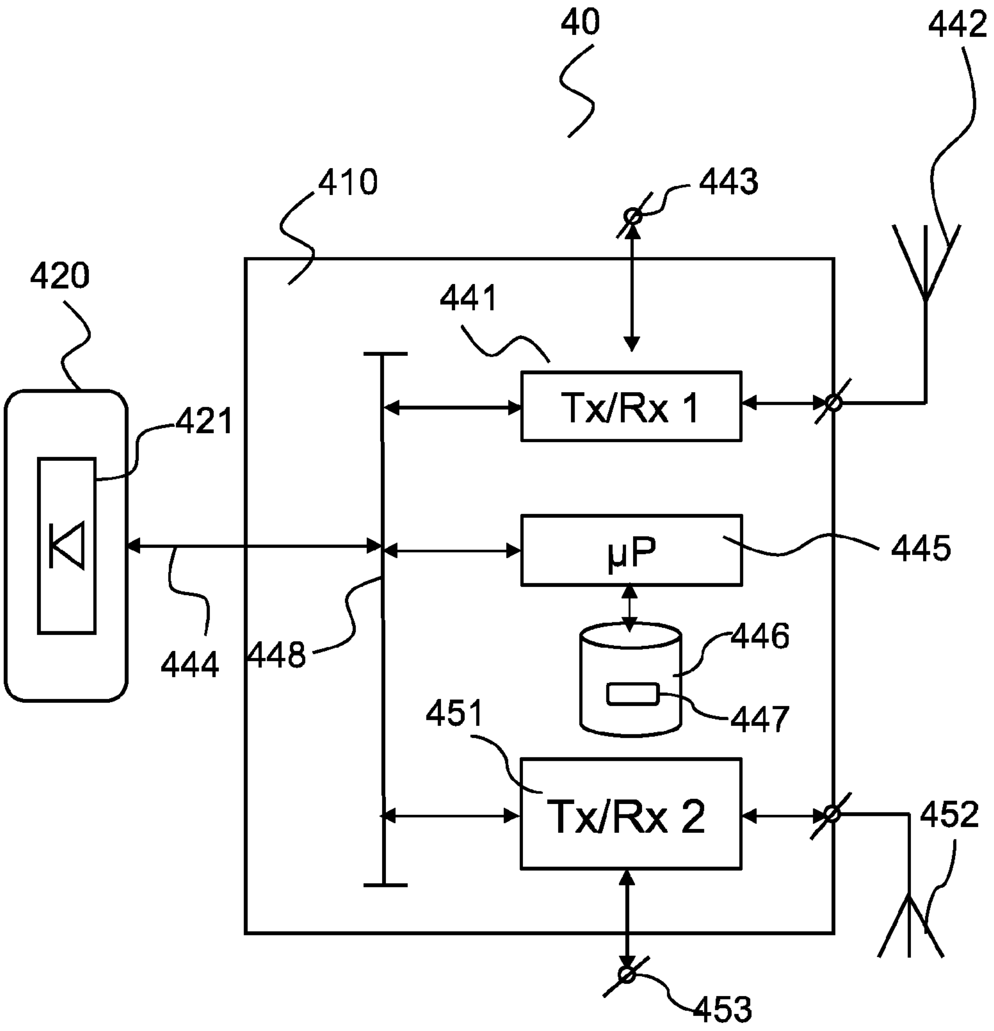
FIG. 6 schematically illustrates an embodiment of a node device arranged for operating in a network of operatively interconnected node devices, in accordance with the present disclosure.

FIG. 6 schematically illustrates an embodiment of a node device 40 arranged for operating in a network of operatively interconnected node devices, configured in accordance with the present disclosure.

The node device 40 comprises a control part or control device 410 and a load such as a lighting fixture or lighting device 420, comprising a lighting module 421, preferably a Light Emitting Diode, LED, lighting module or a plurality of LED lighting modules, operation of which may be controlled by the control device 410 from or through a remote control device, such as a remote or backend server (not shown), for example.

The control device 410 operates a long range communication interface 441, such as a first network adaptor or a transceiver, Tx/Rx 1, module, implemented for example as a part of a cellular modem and arranged for direct wireless message exchange or data packets 442 with a remote control device or backend server. The long range communication interface 441 typically operates according to a mobile communication system technology in a licensed frequency band, such as 2G/3G/4G/5G cellular communication, and other long-range wireless communication technologies, such as known as LoRaWAN communication, for example. However, the long range communication interface 441 may also operate according to a proprietary wireless communication protocol or technology.

The long range communication interface 441 may also be arranged for wired message exchange 443, such as for data exchange over an Ethernet connection and the Internet, or the like.

The control device 410 further operates a short range communication interface 451, such as a second network adapter or transceiver, Tx/Rx 2, module implemented for example as a part of a MCU and arranged for short-range wireless 452 or wired 453 exchange of messages or data packets with another node device in the network, i.e. so called inter-node device communication. Network protocols for exchanging data by networked devices or nodes may comprise ZigBee™, Bluetooth™, as well as WiFi based protocols for wireless networks, and wired bus networks such as DALI™ (Digital Addressable Lighting Interface), DSI (Digital Serial Interface), DMX (Digital Multiplex), and KNX (or KNX based systems), and other proprietary protocols.

The control device 410 further comprises at least one microprocessor, μP, or controller 445, and at least one data repository or storage or memory 446, among others for storing address information of the node device itself and other node devices, such as identifiers 447, IDs, Media Access Control, MAC, addresses and subscriber information of node devices. The repository 446 also stores a network credential for a network comprising the node device 40. Instead of the repository 446, a separate memory or storage accessible to the at least one processor or controller 445 may be provided.

The at least one microprocessor or controller 445 communicatively interacts with and controls the long range communication interface 441, the short range communication interface 451, and the at least one repository or storage 446 via an internal data communication and control bus 448 of the control device 410.

When the node device 40 is deployed in a network as described with reference to the present disclosure, the at least one microprocessor or controller 445 may operate to perform the method described above.

The lighting fixture or lighting device 420 connects 444 to and is controlled from the data communication and control bus 448 by the at least one microprocessor or controller 410.

Those skilled in the art will appreciate that any electric load may be connected 444 to the control bus other than or in addition to a lighting fixture or lighting device 420, such as an access point device or a geographic routing device.

The present disclosure is not limited to the examples as disclosed above, and can be modified and enhanced by those skilled in the art beyond the scope of the present disclosure as disclosed in the appended claims without having to apply inventive skills and for use in any data communication, data exchange and data processing environment, system or network.

The invention claimed is:

1. A method of transmitting a block of data in a network comprising a plurality of operatively interconnected node devices, each node device supporting both long range communication and short range communication, the method comprising the steps of:

receiving, by a node device via long range communication, an indication to receive the block of data via short range communication;

receiving, by said node device, the block of data from at least one other node device via short range communication; and wherein the method further comprises:

requesting, by said node device, a missing part of the block of data via long range communication; and receiving, by said node device, the requested missing part directly of the block of data via long range communication.

2. The method according to claim 1, wherein the at least one other node device is selected, by a remote device, based on at least one of locations, long range communication data consumption, long range communication plans and short/long range communication quality of service of the node devices.

3. The method according to claim 1, wherein two or more other node devices are selected for receiving the block of data via long range communication;

receiving, by different selected node devices, different part of the block of data via long range communication;

transmitting, by each of the selected node devices the respectively received part of the block of data via short range communication; and receiving, by said node device via short range communication, the different parts of the block of data from each of the selected node devices.

4. The method according to claim 3, wherein the steps of transmitting by each of the selected node devices comprise the selected node devices transmitting the different parts of the block of data in a specific order.

5. The method according to claim 3, wherein the step of transmitting by the selected node devices are performed using broadcast or multicast, the broadcast or multicast is preferably repeated multiple times.

6. The method according to claim 3, wherein the at least part of the block of data transmitted by the at least one selected node device is relayed by node devices in the network via short range communication.

7. The method according to claim 1, further comprising:

storing, by said node device, the received part of the block of data to an internal or external storage device.

8. The method according to claim 1, wherein the long range communication comprises wireless mobile communication.

9. The method according to claim 1, wherein the short range communication comprises Bluetooth communication, Zigbee communication, Z-Wave communication or a proprietary communication.

10. The method according to claim 1, wherein the node devices are lighting devices, and the block of data is firmware updates to be received by the lighting devices.

11. A system for transmitting a block of data from a remote device to a node device in a network comprising a plurality of operatively interconnected node devices, each node device supporting both long range communication and short range communication, wherein:

a node device is configured to receive, via long range communication, an indication to receive the block of data from at least one other device via short range communication;

the at least one other node device is configured to receive at least a part of the block of data via long range communication;

the at least one other node device is configured to transmit the at least part of the block of data to said node device via short range communication; and said node device is configured to receive the at least part of the block of data from the at least one other node device;

wherein said node device is configured to request a missing part of the block of data via long range communication; and said node device is configured to receive a missing part of the block of data via long range communication.

12. The system according to claim 11, wherein two or more other node devices are selected for receiving the block of data via long range communication;

different selected node devices are configured to receive different part of the block of data via long range communication;

each of the selected node devices is configured to transmit the respectively received part of the block of data via short range communication; and said node device is configured to receive, via short range communication, the different parts of the block of data from each of the selected node devices.

13. The system according to claim 11, wherein said node device is configured to store the received part of the block of data to an internal or external storage device.

14. The system according to claim 11, further comprising at least one remote device configured to:

select the at least one other node device based on at least one of locations, long range communication data consumption, long range communication plans and short/long range communication quality of service of the node devices.

15. A non-transitory computer readable medium, comprising instructions which, when executed on a processor, cause said processor to carry out the method according to claim 1.

* * * * *